Oct. 10, 1967  R. G. WOOLWORTH  3,346,733
LIGHT TACKLE BOX
Filed Nov. 17, 1964  3 Sheets-Sheet 1

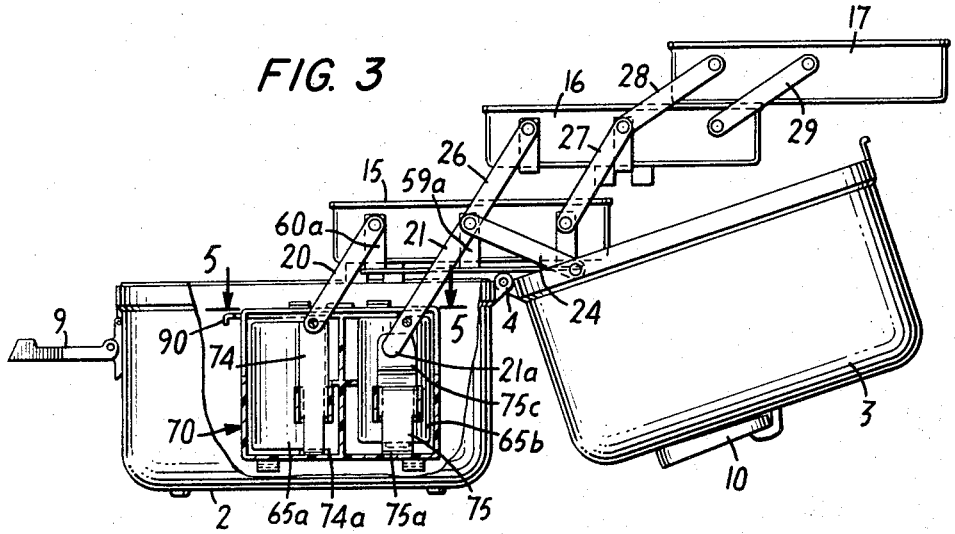
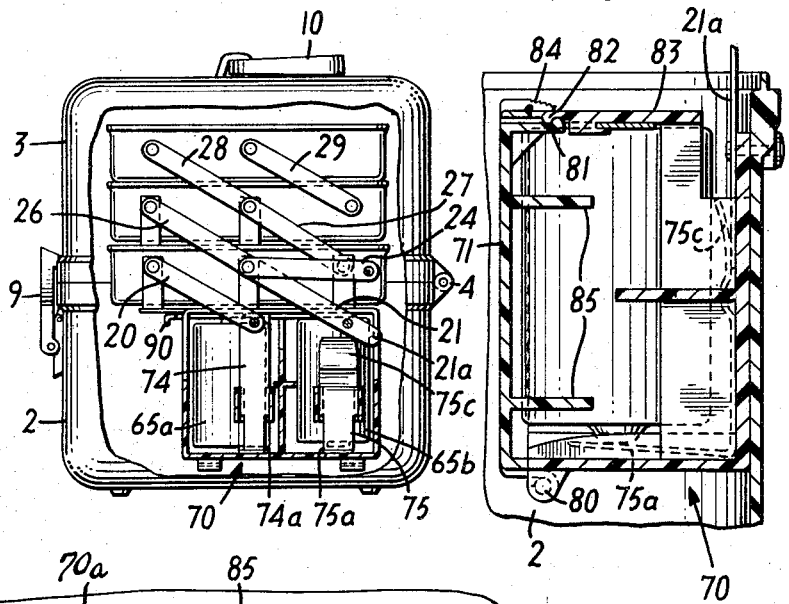
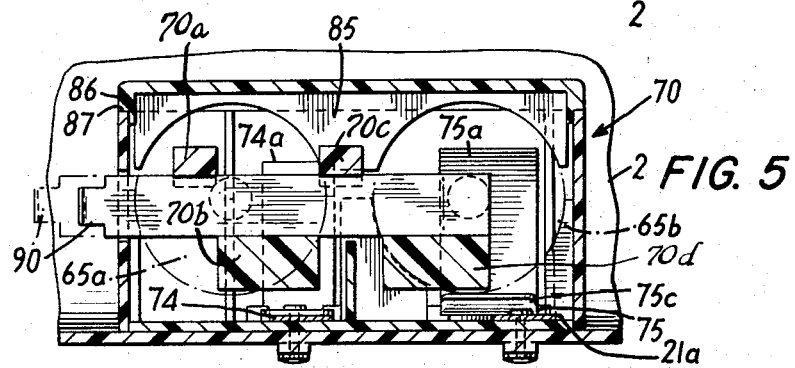

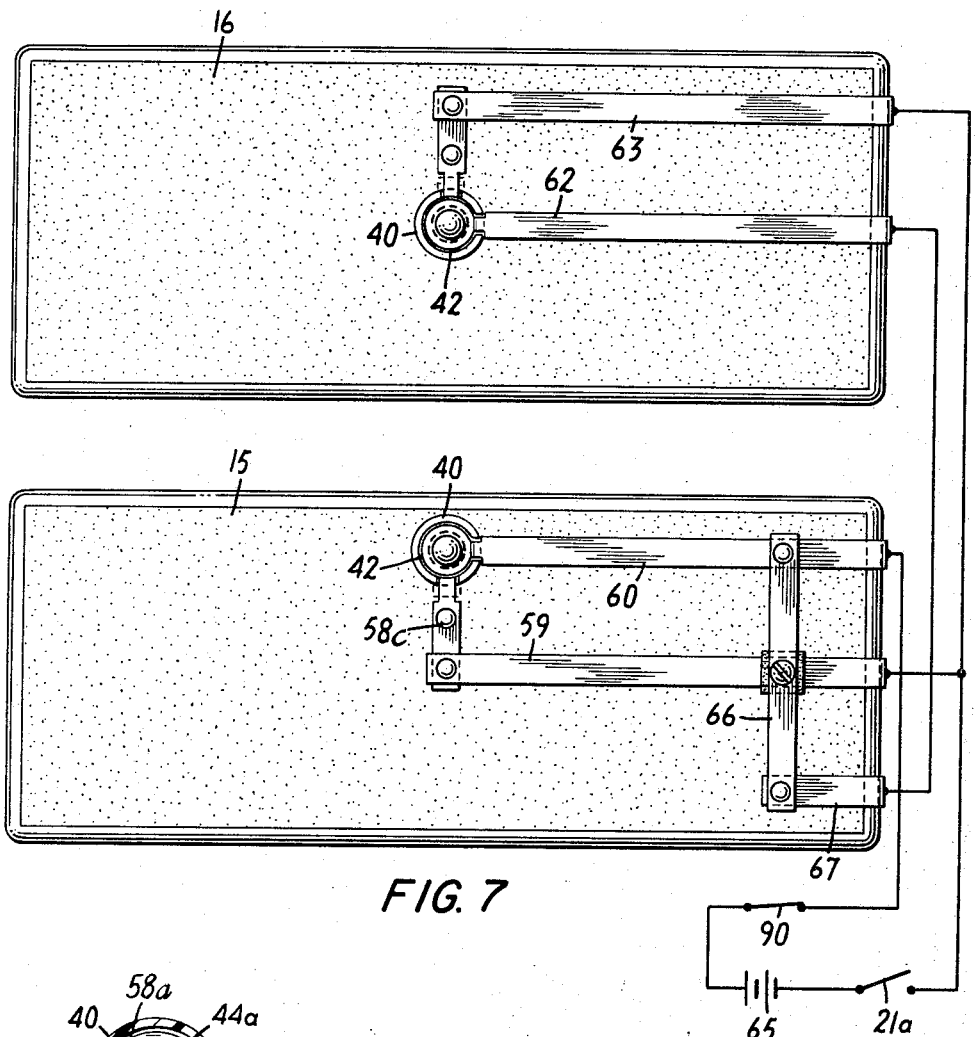
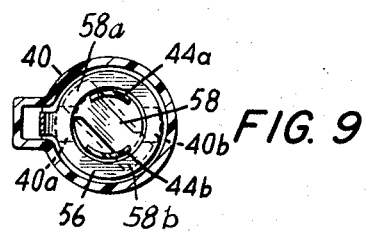
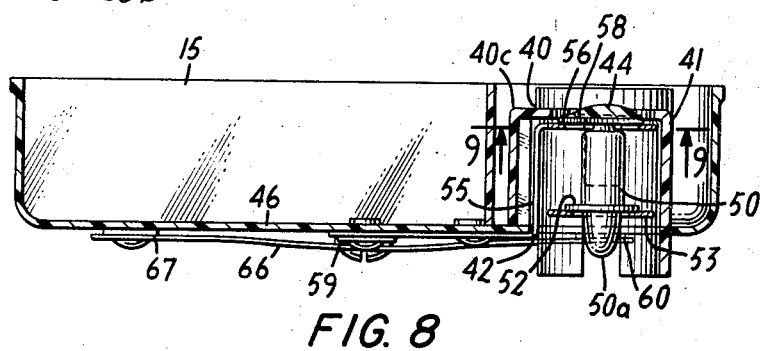

United States Patent Office 3,346,733
Patented Oct. 10, 1967

---

3,346,733
LIGHTED TACKLE BOX
Richard G. Woolworth, Lancaster, Pa., assignor to Old Pal, Inc., Lititz, Pa.
Filed Nov. 17, 1964, Ser. No. 411,818
17 Claims. (Cl. 240—6.4)

This invention relates generally to tool and tackle boxes and more particularly to a lighted box construction applicable to tool and tackle boxes and the like.

Tool and tackle boxes of different sizes and constructions are well known. These boxes generally have one or more trays which can be cantilevered. The trays are generally compartmented or divided by dividers for receiving therein small parts, such as screws, nuts in tool boxes and lures, flies and very small hooks etc. in tackle boxes. When these boxes are in use during daytime, they provide a convenient storage and the parts therein are readily available. However, if the tool or tackle box is to be used at night, a separate light source must be provided to provide the necessary light for finding the small parts.

It is a principal object of the present invention to provide a box construction usable for tool boxes and tackle boxes and the like in which the box is provided with its own light source for lighting the trays and interior thereof.

A feature of the invention is the provision of a box having a bottom half and preferably a full-opening lid pivotally connected to the bottom half for opening and closing the bottom half. The box is provided with trays which are cantilevered to the lid so that the trays are automatically moved to a position in which they are housed in the box when the lid is closed and for moving them to a position out of the bottom half when the lid is opened a given extent. A light is provided for lighting the interior of the tray and is automatically turned on and off by the cantilevers supportably mounting the trays in the box.

Another feature of the invention is the provision of the tray cantilevers which are part of the circuit for the light. The individual lights in the trays are disposed for edge lighting so that the maximum light is available along the full length of the trays. One of the lights is disposed for lighting an individual tray on which it is mounted and the lower bottom half of the box.

Another feature of the invention is the provision of a manual control for rendering automatic control of the light effective and ineffective and for turning off the light at will with the box in an open condition.

Other features and advantages of the box in accordance with the present invention will be better understood as described in the following specification and claims, in conjunction with the drawings in which:

FIG. 3 is an end view, with a portion cut away, of the box in FIG. 1 and illustrates circuitry of the invention;

FIG. 4 is an end view of the box in FIG. 1, with a part cut away, illustrating the internal arrangement of a box according to the invention;

FIG. 5 is a section view taken along section line 5—5 of FIG. 3;

FIG. 6 is a fragmentary section view of a part of the box in FIG. 3, illustrating details of a power pack housing in the box;

FIG. 7 is an underside view of two trays in the box in FIG. 1 and illustrates electrical circuitry according to the invention;

FIG. 8 is a section view of a tray in FIG. 6 and illustrates a construction for edge lighting trays of the box of the invention; and FIG. 9 is a section view taken along line 9—9 of FIG. 8.

Figure 1:
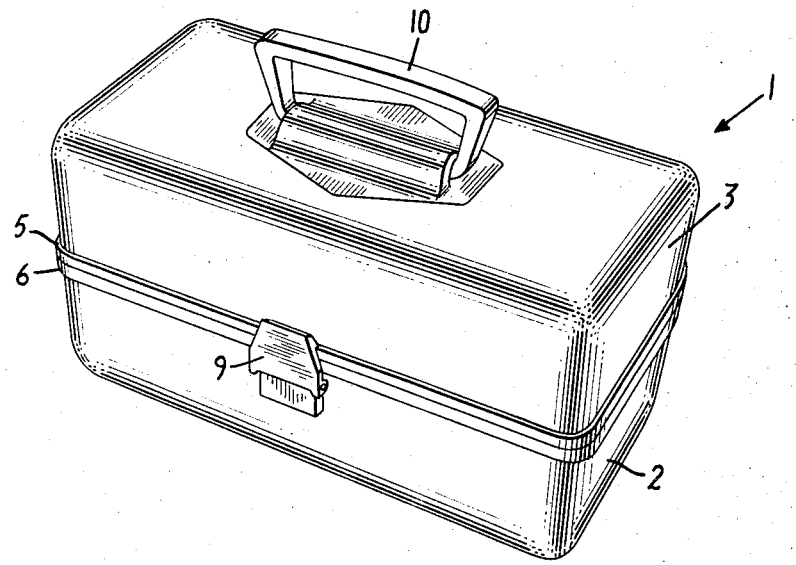
FIG. 1 is a perspective view of a box according to the invention illustrated in a closed condition.

While the invention will be illustrated and described as applied to a tackle box, it will be understood that the invention is equally applicable to tool boxes and the like of various sizes and can be made of different suitable materials.

According to the drawing the invention comprises a tackle box 1 comprising means delivering a bottom half 2 on which is pivotally mounted a lid 3 for opening and closing the bottom half and jointly therewith defining the box. Hinge means 4 are provided on the box pivotally connecting the lid 3 to the bottom half 2. The hinge is preferably constructed so that the lid is a full-opening lid which permits the box to sit solid when open. The box parts heretofore described may be made of any suitable material, for example a tough, high impact polystryrene or other suitable plastic which will not chip, dent, crack or corrode and may be ornamentally colored. Those skilled in the art understand that the bottom 2 of the box is described as a bottom half but this is not restricted to mean that the lid and the lower part 2 are of equal height. The upper and lower parts need not be true halves and the terms bottom half encompasses all possible relative dimensions between the parts 2 and 3.

The bottom half and lid 3 are preferably provided with watertight edge constructions along the individual cooperating edges 5, 6. The box is provided with a spill-proof lock or safety latch assembly 9 for example, according to United States Patent 3,134,617 by which the box can be locked in a closed condition. The lid is provided with a handle 10 for transporting the tackle box and operating the lid 3 to an open and closed condition.

The box bottom 2 is a large open utility tray when the box is in an open condition and the lid 3 may be provided with any suitable number of retaining wells providing a convenient place to store hooks, weights, flies, bobbins, shot, etc. without fear of loss while changing lures and the like. The box is provided with a plurality of cantilevered trays comprising a lower tray 15 pivotally mounted on the bottom half with cantilevers on both ends thereof, for example cantilevers 20, 21 are cantilevered to the lid with cantilevers, for example a cantilever 24. Upper trays 16, 17 are mounted on the lowermost tray 15 with pairs of cantilevers 26, 27, 28 and 29. These trays may be actuated to a position illustrated in FIG. 3 allowing access to the interior thereof when the box is opened.

Figure 2:
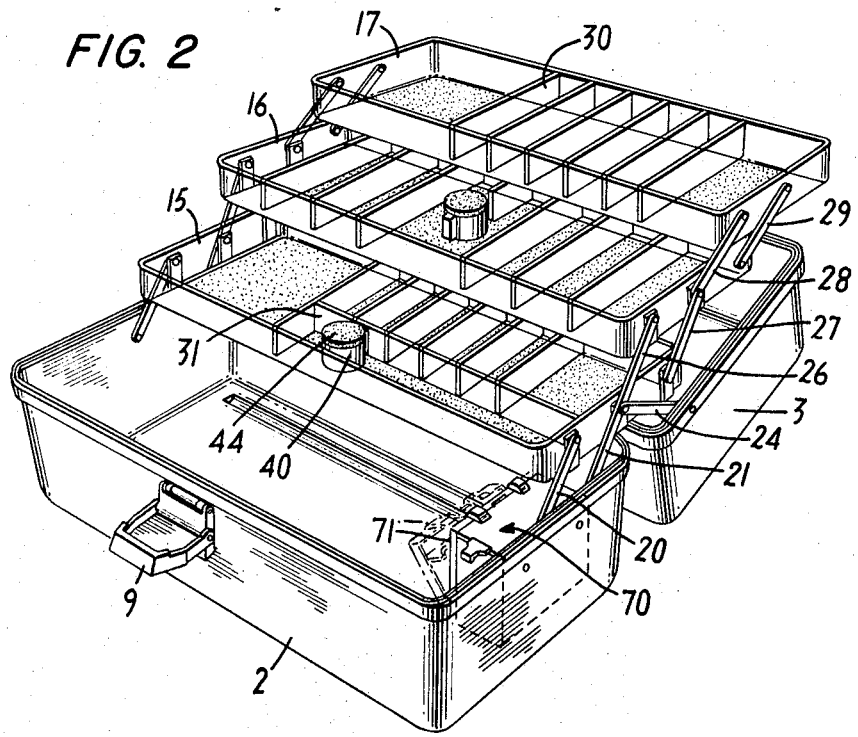
FIG. 2 is a perspective view of the box in FIG. 1 in an open condition.

It will be understood that the box is provided with cantilevers which are mounted on both ends of the trays as illustrated in FIG. 2 and better seen on one end in FIG. 3. The cantilevers are made of a suitable material of sufficient strength to support the trays in an open position to which they are actuated automatically by the lid 3 when opened to an open position and securely mounted and held within the box and actuated to a position in which they are housed within the box when the lid 3 is closed. The cantilevers are preferably made of a material that will not corrode or are protected or coated against environmental conditions encountered in use.

The individual trays are preferably compartmented as shown in FIG. 2, for example with a plurality of dividers 30, 31 spaced along the length of the trays to define therein selected different sizes of compartments for receiving flies, hooks, lures, shot etc. The individual trays extend the full length of the bottom half. The trays and dividers are preferably constructed of a plastic material to permit edge-lighting thereof as hereinafter described so that light is transmitted throughout the interior of the tray and the tray is made to "glow." A plastic material that has been found suitable for the trays is an acrylic plastic having the trade name "Forticel" and made by the Celanese Corp. This material has "glass rods" or "optic fibers" for longitudinal transmission of light along the length of the trays.

The tackle box according to the invention is provided with a lighting circuit built into the box and provided with lights, as later described, for lighting the interior of the trays and at least the bottom half automatically with the box open and with controls for turning off the light automatically or manually.

Two trays 15, 16 intermediate the utility tray 2 and the uppermost tray 17 are each provided with a light socket 40 having sidewalls 41 extending circumferentially of an opening 42 on the bottom of an individual tray. The top of the socket 40 is open and is provided with a removable closure or cap 44. The socket 40 may be secured to the bottom 46 of the individual trays and is preferably constructed integral therewith by molding and is made, for example, of a translucent plastic material of which the individual trays 15, 16 are made. The cap or button 44 is provided with a pair of downwardly depending projections 44a, 44b received in the socket 40 through a center opening of a circumferential flange 40c of the socket and providing surfaces, as later described, for locking the cap 44 onto the socket 40 when the cap is rotated into the position illustrated in FIG. 8 after the projections have been received substantially aligned with notches 40a and 40b in the flange 40c and at about 90° from the final locking position.

A respective light bulb 50 is received in each socket 40 when the cap 44 is removed. The bulb is mounted therein so that a filament 50a of the bulb is substantially aligned with the edge of the tray bottom 46 defining the opening so that when the light bulb is "on," the tray is lighted both by the light from the bulb through space and by means of edge-lighting so that the entire tray and dividers tend to "glow." Furthermore, light, for example from the lowermost tray 15, lights the bottom half 2.

In order to provide power to the light bulb 50 it is provided with a circular circumferential contact 52 which rests on a stationary conductive ring conductor or circular contact 53 through the bulb extends. The conductive ring conductor is electrically connected to a power source or pack as later described. The socket is provided with an internal conductor 55 having an annular upper part 56, through the center or which is inserted the bulb. A metal bridge contact 58 is mounted in a recess on the underside of the button 44. The bridge contact is held in a fixed position by slots in the depending projections 44a, 44b as shown in FIG. 9. The ends 58a, 58b thereof extend outwardly from the depending projections 44a, 44b and are received in the notches 48, 49 and when the cap is rotated to the position shown in FIG. 9, they bear on the underside of the flange 40c and the cap is held on the socket. The contact 56 is bridged by the bridging contact 58 when the button is in position after a light bulb has been inserted. When the button or cap 44 is replaced and locked in position the pressure applied from the bottom stationary contact or conductor 53 causes the contact 58 to make contact with the bulb for energizing it automatically and manually as later described.

The internal conductor 55 is electrically connected to a conductor 58c and a conductor 59 riveted or otherwise secured on the underside of the tray as illustrated. The conductor 53 is connected to an electrical conductor 60 connected in parallel with a pair of conductors 62, 63 to a power pack or source of power 65 by conductors 66, 67. The conductors on the trays heretofore described are made of a suitable material and are provided with portions, for example 59a, 60a, extending alongside an end of the tray, for example, to make electrical connection to the cantilevers and the power source through cantilevers 20, 21 which also function as conductors as well as support for the trays. A similar connection is established between the pairs of cantilevers 26, 27 supporting the tray 16 and electrically connected to conductors 62, 63 which provide power to a light bulb in the tray 16. It will be understood that the cantilevers, for example, the cantilever 24, supporting the lid on the tray may be electrically insulated from the rest of the cantilever system. Moreover, the cantilevers on the opposite side or end of the box from that shown in FIGS. 3 and 4 need not be conductors.

The source of power 65 comprises a power pack comprising batteries 65a, 65b housed in battery box or housing 70 in the bottom half 2 provided with a pivotally mounted cover 71 operable to an open and closed position and made, for example, of a suitable plastic. The two batteries are mountable electrically connected to two conductors 74, 75 disposed on an inner edge of the box as illustrated in FIG. 5 and comprise extensions 74a, 75a on which the batteries 65a, 65b rest with the battery 65b in inverted position. The batteries are housed in the housing 70 securely so that they are not free to move in the tackle box. The lid 71 is pivotally secured to the housing 70 by means of a hinge 80, FIG. 6, and opens into the bottom half 2. The lid is provided with at least one catch for positively locking the lid, for example, a center catch 81 integral with the lid is provided. The catch has a recess for receiving a prominence 82 on the underside of a top part 83 of the housing 70. A pair of spaced guides, for example, guides 84 override the top part 83 of the housing and tend to hold the catch 81 engaged.

The lid 71 has integral therewith a pair of spacers 85 recessed to receive the batteries as shown in FIGS. 5 and 6, and these hold the batteries in the power pack housing 70 in position in cooperation with the resilient conductors 74, 75. When it is desired to change batteries the housing is opened by inserting a prod, for example, a coin in a recess, not shown, in a side edge 86 of the lid 71 to allow a force to be exerted between the lid 71 and a side edge surface 87 of the housing so that the housing can be opened against the strong positive lock comprising the catch 81, 82 and the overriding guides 84.

In order to connect the batteries in series, a switch 90 is provided comprising a manually operable strap slidable longitudinally, axially along its longitudinal length in a guide, formed by the guide portions 70a, 70b, 70c, 70d in the box 70. The strap switch 90 is operable to a position for bridging upper contacts of the batteries. When the strap 90 is in the position shown in solid lines in FIG. 5, the circuit is closed as illustrated diagrammatically in FIG. 6 and when the strap 90 is pulled manually to the position shown in broken lines, the circuit is opened.

In order to provide for automatic opening and closing of the circuitry illustrated in FIG. 6 for automatically turning "on" and "off" the light bulbs under control of the lid 3 or its operative position, the cantilever 21 is provided with an extension 21a that makes electrical contact with a stationary spring or blade contact portion 75c of the conductor 75 when the box is in an open condition as illustrated in FIG. 3. When the box lid is closed, the extension 21a clears the contact portion 75c, as shown in FIG. 4, so that the extension 21a and the contact portion 75c functions as a knife switch, as illustrated in FIG. 6, in an open condition of the box as illustrated in FIG. 3. The blade portion 75c is curved, as shown in FIG. 6, to allow functioning as a knife switch.

The electrically conductive cantilevers are constructed, for example, of an electrically conductive material such as brass. The cantilevers which are conductive are pivotally connected and make electrical contact with each other through side surfaces thereof whether the box is in an open or a closed condition. Those skilled in the art will understand that the conductors on the bottom side of the individual trays may be, for example, constructed as electrical paths of a metallic conductive paint on the trays, electrical tape or printed circuits and may be integrally formed thereon. Moreover, the tray bottom surfaces may be provided with a suitable frosting or the like to assist in light diffusion.

Moreover, the box can be constructed with a single cantilevered tray comparable to the tray 15 or can be constructed with even a larger number of trays than three in a construction similar to that illustrated in the drawing. Furthermore, the cantilevered trays may be provided with more than one light. Two or more lights can be mounted on the trays and connected in parallel according to the teachings of the invention. Thus, instead of centering a single light in a given tray, two lights can be mounted in parallel in a given tray in spaced positions with the circuit or conductors according to the invention.

While a preferred embodiment of the invention has been shown and described, it will be understood that many modifications and changes may be made within the true spirit and scope of the invention.

What I claim and desired to secure by Letters Patent is:

1. A box comprising means defining a bottom half of said box, a lid pivotally mounted for opening and closing said bottom half and thereby jointly therewith defining said box, at least one tray in said box, said tray having a bottom and sidewalls comprising a material for transmitting light therealong, a light receptacle mounted on the tray, a light positioned in the light receptacle to project light downwardly onto any lower tray and into the bottom half of said box and to apply light to edges of the tray for transmission along the bottom and the sidewalls of the tray, and circuit means in said box including connections for a power source for turning said light on and off.

2. A box according to claim 1, including means for receiving a power source in said box for connection to said circuit means.

3. A box according to claim 1, including means cantilevering said tray, and said circuit means including said cantilevering means.

4. A box according to claim 3, in which said circuit means comprises means cooperative with said cantilevering means for turning said light on automatically when said lid is opened and for turning said light off automatically when said lid is closed.

5. A box comprising means defining a bottom half of said box, a lid pivotally mounted for opening and closing said bottom half and thereby jointly therewith defining said box, at least one tray in said box, positioned at the bottom of the tray a receptacle for a light, a light mounted in the light receptacle to project light downwardly onto any lower tray and into the bottom half of said box.

6. A box according to claim 5, in which said tray is light-permeable.

7. In a box, means defining a bottom half of said box, a lid pivotally mounted for opening and closing said bottom half and jointly therewith defining said box, at least one cantilevered tray in said box said tray having a bottom and sidewalls comprising a material for transmitting light therealong, means cantilevering said cantilevered tray for automatically moving the cantilevered tray to a position in which said cantilevered tray is housed in said box when the lid is closed from an open position and for moving it to a position out of said box when the lid is opened a given extent, a light positioned on the tray to project light downwardly onto any lower tray and into the lower half of said box and to apply light to edges of the material for transmission along the bottom and the sidewalls of the tray means for automatically turning on said light when the lid is opened and for automatically turning it off when the lid is closed.

8. In a box, means defining a bottom half of said box, a lid pivotally mounted for opening and closing said bottom half thereby jointly therewith defining said box, at least one tray in said box, said tray having a bottom and sidewalls comprising a material for transmitting light therealong, means connected to said tray and to said lid for automatically moving said one tray to a position in which said one tray is housed in said box when the lid is closed from an open position and for moving it automatically to a position at least partially out of said bottom half when the lid is opened a given extent, and circuit means in said box comprising a light positioned on the tray to project light downwardly onto any lower tray and into the lower half of said box and to apply light to edges of the material for transmission along the bottom and the sidewalls of the tray.

9. A box comprising, means defining a bottom half of said box, a lid pivotally mounted for opening and closing said bottom half and jointly therewith defining said box, at least one cantilevered tray in said box, said tray having a bottom and sidewalls comprising a material for transmitting light therealong, means cantilevering said cantilevered tray to said lid for automatically moving the tray to a position in which said tray is housed in said box when the lid is closed from an open position and for moving it to a position out of said bottom half when the lid is opened a given extent, a light positioned on the tray to project light downwardly onto any lower tray and into the lower half of said box and to apply light to edges of the material for transmission along the bottom and the sidewalls of the tray, means comprising circuit means in said box for automatically turning on said light when the lid is opened and for automatically turning it off when the lid is closed.

10. A box comprising, means defining a bottom half of said box, a lid pivotally mounted for opening and closing said bottom half and jointly therewith defining said box, at least one tray in said box, said tray having a bottom and sidewalls comprising a material for transmitting light therealong, means for automatically moving said one tray to a position in which said tray is housed in said box when the lid is closed from an open position and moving to a position out of said bottom half when the lid is opened a given extent, and circuit means in said box including means operable by said lid for lighting the interior of at least said one tray and the bottom half of the box when the box is opened, said lighting means including a light positioned on the tray to project light downwardly onto any lower tray and into the lower half of said box and to apply light to edges of the material for transmission along the bottom and the sidewalls of the tray.

11. A box comprising, means defining a bottom half of said box, a lid pivotally mounted for opening and closing said bottom tray, and jointly therewith defining said box, at least one tray in said box, said tray having a bottom and sidewalls comprising a material for transmitting light therealong, means connected to said tray and said lid for automatically moving said one tray to a position in which said one tray is housed in said box when the lid is closed from an open position and for moving it to a position out of said bottom half when the lid is opened a given extent, and circuit means in said box comprising a light positioned on the tray to project light downwardly onto any lower tray and into the lower half of said box and to apply light to edges of the material for transmission along the bottom and the sidewalls of the tray.

12. A box according to claim 11, including means operable automatically to turn on said light when said lid is in an open position.

13. A box according to claim 12, including switch means to render the last mentioned means effective and ineffective.

14. In a tackle box, means defining a bottom half of said box, a lid pivotally mounted for opening and closing said bottom half and jointly therewith defining said box, a plurality of cantilevered trays in said box, at least one of said trays having a bottom and sidewalls comprising a material for transmitting light therealong, cantilever means cantilevering said cantilevered trays in said box for automatically moving at least some of said cantilevered trays to a position in which said plurality of trays are housed in said box when the lid is closed from an open position and moving them to a position out of the bottom half when the lid is opened a given extent, at least one light positioned on at least one of the trays to project light downwardly onto any lower tray and into the bottom half of said box and to apply light to edges of the material for transmission along the bottom and the sidewalls of the tray, means in said box for automatically turning on said light when the lid is opened and for automatically turning it off when the lid is closed.

15. In a tackle box according to claim 14, in which said cantilever means comprises a plurality of electrically conductive conductors disposed electrically associated defining a circuit for applying power to said light.

16. In a tackle box according to claim 15, including a power source electrically connected to said circuit.

17. In a tackle box, means defining a bottom half of said box, a full-opening lid pivotally connected to said utility tray for opening and closing said bottom half and jointly therewith defining said box, at least one cantilevered tray in said box, means cantilevering said tray comprising means for automatically moving said cantilevered tray to a position in which said tray is housed in said box when the lid is closed from an open position and for moving it to a position out of said bottom half when the lid is opened a given extent, a circuit for lighting the interior of said tray and said bottom half, means in said circuit comprising said means cantilevering said tray for energizing said circuit when said lid is opened and for deenergizing it when said lid is closed said one tray comprises a light bulb receptacle, and a conductor in said receptacle for connecting a light bulb to said circuit, said light bulb is disposed to edge-light said one tray, said tray comprises a translucent material having light transmitting rods therein for transmitting light along the edge of the tray.

References Cited
UNITED STATES PATENTS

| | | | |
|---|---|---|---|
| 1,506,300 | 8/1924 | Harp. | |
| 2,481,394 | 9/1949 | Cannava | 240—6.4 |
| 2,517,914 | 8/1950 | Nowaczek | 240—6.4 |
| 2,753,438 | 7/1956 | Cialoni | 240—73 XR |
| 3,065,335 | 11/1962 | Madansky | 240 |

NORTON ANSHER, *Primary Examiner.*

JOHN M. HORAN, *Examiner.*

C. C. LOGAN, *Assistant Examiner.*